United States Patent [19]

D'Herbecourt et al.

[11] Patent Number: 5,418,046

[45] Date of Patent: May 23, 1995

[54] COMPOSITE ARTICLES HAVING MULTICOLORED COATINGS

[75] Inventors: Bruno D'Herbecourt, Bernay; Gilbert Copin, Nassandres, both of France

[73] Assignee: Atochem, Puteaux, France

[21] Appl. No.: 274,737

[22] Filed: Jul. 18, 1994

Related U.S. Application Data

[63] Continuation of Ser. No. 740,540, Aug. 5, 1991, abandoned.

[30] Foreign Application Priority Data

Aug. 3, 1990 [FR] France .................. 90 09983

[51] Int. Cl.⁶ .................. B32B 3/00; B32B 5/16
[52] U.S. Cl. .................. 428/204; 428/206; 428/207; 428/327
[58] Field of Search .......... 428/147, 204, 206, 207, 428/327, 323, 413, 450, 452, 458, 475.5, 480, 500; 106/285; 525/934, 940

[56] References Cited

U.S. PATENT DOCUMENTS

| | | | |
|---|---|---|---|
| 3,639,147 | 2/1972 | Benefiel et al. | 428/216 X |
| 4,025,474 | 5/1977 | Porter, Jr. et al. | 525/160 X |
| 4,055,607 | 10/1977 | Sullivan et al. | 525/155 |
| 4,180,489 | 12/1979 | Andrew et al. | 428/402 |
| 4,190,715 | 2/1980 | Isaksen et al. | 525/163 |
| 4,291,135 | 9/1981 | Höhlein et al. | 525/101 |
| 4,457,965 | 7/1984 | Rocholl et al. | 428/141 |
| 4,499,151 | 2/1985 | Dowbenko et al. | 428/447 |
| 4,717,620 | 1/1988 | Bowen et al. | 428/323 |

FOREIGN PATENT DOCUMENTS

| | | |
|---|---|---|
| 47508 | 9/1981 | European Pat. Off. . |
| 2273679 | 6/1974 | France . |
| 59-31134 | 8/1984 | Japan . |
| 60-241970 | 11/1985 | Japan . |
| 2148907 | 6/1985 | United Kingdom . |

*Primary Examiner*—D. S. Nakarani
*Assistant Examiner*—H. Thi Le
*Attorney, Agent, or Firm*—Burns, Doane, Swecker & Mathis

[57] ABSTRACT

Aesthetically pleasing multicolored composite articles comprise a support substrate, e.g., a metal or alloy thereof, coated with a multicolored face surface coating composition including at least one crosslinked hydroxylated polymer, such at least one crosslinked hydroxylated polymer having dispersed therein a multicolored powder of at least one solid thermoplastic resin, e.g., a polyamide or polyetheramide, and, optionally, with at least one colored interlayer deposited between the support substrate and such multicolored face surface coating composition.

24 Claims, No Drawings

COMPOSITE ARTICLES HAVING MULTICOLORED COATINGS

This application is a continuation of application Ser. No. 07/740,540, filed Aug. 5, 1991 now abandoned.

BACKGROUND OF THE INVENTION

Field of the invention

The present invention relates to multicolored coating films and to composite articles comprising a support substrate coated with such multicolored films.

By "multicolored coating" is intended a colored coating that is nonuniform to the eye. Exemplary thereof are coatings having a speckled, pebbled, etc., appearance.

SUMMARY OF THE INVENTION

Briefly, the present invention features a multicolored coating material for a variety of substrates, comprising:
(i) one or more optional underlayers (interlayer material) of a uniform tint not containing thermoplastic powders of the same nature as those of the intended surface layer or layers; and
(ii) one or more surface layers (surface coating) which comprise a dispersion, in a colorless varnish, of powders of colored thermoplastic resins, at least one tint or color of which is different from that used in the underlayer or underlayers and, optionally, colorless powders.

DETAILED DESCRIPTION OF THE PREFERRED EMBODIMENTS OF THE INVENTION

More particularly according to the present invention, in one embodiment thereof, the one or more surface layers comprise a colorless varnish wherein thermoplastic powders having different colors are dispersed.

The surface layer or layers of the coating films according to the invention contain a binder of 1% to 80% by weight of solid thermoplastic resins in the powder form, having a mean particle size ranging from 0.5 to 200 μm, and 1% to 80% by weight of at least one polymer bearing free hydroxyl groups, the composition also containing a crosslinking agent for the hydroxylated polymer or polymers and 19% to 80% by weight of at least one organic solvent for the hydroxylated-polymer or polymers having a boiling point of from 140° to 310° C.

By "thermoplastic resins" are intended thermoplastic polymers having a softening point ranging from 110° to 230° C., preferably polyamides.

Exemplary such polyamides include polymers of one or more ω-aminomonocarboxylic acids having from 6 to 12 carbon atoms per molecule, or the corresponding lactams thereof, for example polycaprolactam (PA-6), the polymer of ω-aminoundecanoic acid (PA-11) and polylauryllactam (PA-12), or the copolymers of, for example, caprolactam and ω-aminoundecanoic acid (PA-6/11), caprolactam and lauryllactam (PA 6/12) and caprolactam, ω-aminoundecanoic acid and lauryllactam (PA-6/11/12).

Other representative polyamides include the polycondensation products of a diamine, for example, hexamethylenediamine, and a dicarboxylic acid, for example adipic acid, sebacic acid, dodecanedicarboxylic acids and terephthalic acid. Exemplary of such polyamides are poly(hexamethylenediamide) (PA-6.6), poly(hexamethylenesebacamide) (PA-6.10) and poly(hexamethylenedodecanedicarboxyamide) (PA-6.12). Mixtures of polyamides may also be used, provided that their softening point ranges from 110° to 230° C. Preferably, PA-11, PA-12, PA-6/12 and/or PA-12.12 are used, whether alone or in mixtures thereof.

The thermoplastic resins also include the polyetheramides and the polyetheresteramides, in particular those described in FR-2,273,021 and FR-2,401,947.

The powders may be prepared by grinding the polymers or by direct polymerization to the grain size distribution desired, as described in EP-192,515.

According to the invention, the softening point of the thermoplastic resins ranges from 110° to 230° C., preferably from 120° to 210° C. The softening point is generally determined by means of a Koefler bench.

The binder contains, as a second component, 1% to 80% by weight, preferably 35% to 75% by weight, of at least one hydroxylated polymer having a number average molecular weight ranging from 800 to 20,000, preferably from 1,000 to 10,000 and a hydroxyl number (functionality) of 1.5 to 6, preferably 1.8 to 5.

Such polymers bearing hydroxyl radicals typically comprise a polyacrylate, an epoxy resin or a polyester having the molecular weight and hydroxyl functionality required. The polyester resin is typically prepared from one or more di, tri- and/or multivalent, optionally including monovalent aliphatic and/or cycloaliphatic alcohols and one or more di-, tri- and/or multivalent, optionally including monovalent aliphatic, cycloaliphatic and/or aromatic carboxylic acids, and/or derivatives of such alcohols and/or carboxylic acids, such as epoxy compounds, and the esters or anhydrides or such acids. Exemplary alcohols or derivatives thereof include lauryl alcohol, benzyl alcohol, cyclohexanol, ethylene glycol, 1,2-propanediol, propylene oxide, 1,3-propanediol, 2,2-dimethyl-1,3-propanediol, 1,2-butanediol, 1,3-butanediol, 1,4-butanediol, 1,5-pentanediol, 3-methyl-1,5-pentanediol, 1,6-hexanediol, 2-hexyl-1,6-hexanediol, 2,2,4-trimethyl-1,6-hexanediol, 2,4,4-trimethyl-1,6-hexanediol, 1,4-dimethylolcyclohexane, 2,2-bis(4-hydroxycyclohexyl)propane,2,2-bis(p-phenyleneoxyethanol)propane, 2,2-bis(p-phenyleneoxypropan-2-ol)propane, glycerol, glycidol, trimethylolethane, 1,1,1-trimethylolpropane, dimethylolpropionic acid, pentaerythritol, the etherification products of diols and polyols, for example of di- and triethyleneglycol, polyethyleneglycol, di-, tri-, tetra- and pentaerythritol and the neopentylglycol ester of hydroxypivalic acid (ester-diol 204). It is preferred to use diols and/or triols having 2 to 12 successive carbon atoms. More particularly, a diol and/or triol having 2 to 8 carbon atoms is used, for example, ethyleneglycol, 2,2-dimethyl-1,3-propanediol, 2-methyl-2-propyl-1,3-propanediol, glycerol, trimethylolethane and 1,1,1-trimethylolpropane.

Exemplary carboxylic acids or derivatives thereof include benzoic acid, branched or linear fatty acids, for example valeric acid, heptanoic acid, 2-ethylhexanoic acid, pelargonic acid, isononanoic acid, lauric acid, the fatty acid of cocoa oil, the fatty acid of linseed oil, the fatty acid of sunflower oil, the fatty acid of tall oil, linoleic acid, linolenic acid, stearic acid and branched fatty acids having 18 to 22 carbon atoms; dicarboxylic (cyclo)aliphatic acids, for example maleic acid or anhydride thereof, fumaric acid, itaconic acid, citraconic acid, malonic acid, succinic acid, glutaric acid, adipic acid, azelaic acid, trimethyladipic acid, tetrahydrophthalic acid, hexahydrophthalic acid, endomethylenetetrophthalic acid and hexachloroendomethylenetetrahydrophthalic acid; aromatic carboxylic acids, for example o-phthalic acid or anhydride thereof, dichlorophthalic acid, isophthalic acid, terephthalic acid, dimethyl terephthalate, trimellitic acid and pyromellitic acid. Preferably, a (cyclo)aliphatic or aromatic di- or tricarboxylic acid having from 4 to 10 carbon atoms is used, preferably adipic acid, azelaic acid and/or isophthalic acid.

It is preferred to use an aromatic or nonaromatic saturated polyester. The polyester resin typically has an acid number ranging from 0 to 70, preferably 0 to 35 and more preferably 0 to 15.

To further improve the properties of the ultimate coating, it may be desirable to use a polyester resin containing silicon, which is prepared by reacting a fraction of the hydroxyl groups of a hydroxylated polyester with the alkoxy groups of an alkoxysilane type compound. This results in the separation of the corresponding alkanol and the bonding of the silicon compounds to the polyester resin by means of one or more ether bridges. In addition to the alkoxy groups, such as the methoxy and butoxy groups, the silane groups typically include hydrocarbon substituents, such as methyl and phenyl groups. Exemplary silicon compounds include those of the following general formulae:

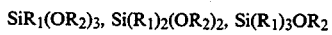

and

wherein $R_1$ is a hydrocarbon radical having from 1 to 8 carbon atoms, for example a methyl, ethyl or a phenyl radical and $R_2$ is an alkyl radical having from 1 to 4 carbon atoms, for example a methyl,m ,ethyl or butyl radical. Typically, these addition compounds, silicon-polyester compounds, contain the silicon compound in an amount of 5% to 40% by weight.

Exemplary crosslinking agents for the hydroxylated polymer or polymers include the aminoplasts containing N-methylol and/or N-methylolethers groups.

Representative of such aminoplasts include those prepared by reacting an aldehyde, for example formaldehyde, with a compound containing amino or amido groups, such as melamine, urea, N,N'-ethylene-urea, dicyandiamine and benzoguanamine; processes for the preparation of these compounds are described in Houben-Weyl, *Methoden der organischen Chemie* (Methods of Organic Chemistry), Vol. 14/2, pages 319–371 (1063). It is preferred that the compounds described above be partially or completely etherified with alcohols having from 1 to 6 carbon atoms, for example with methanol, ethanol, n-propanol, isopropanol, n-butanol, isobutanol, amyl alcohol, hexanol or mixtures thereof. In particular, a methylolmelamine having 4 to 6 methylol groups per melamine molecule is used, at least 3 methylol groups being etherified with methanol, ethanol, a propanol or a butanol or a condensation product of formaldehyde and N,N'-ethylenediurea etherified with butanol. More particularly, a hexaalkoxymethylmelamine, the alkoxy group of which having 1 to 4 carbon atoms, is used.

The preferred crosslinking agents comprise the aromatic, aliphatic or cycloaliphatic isocyanate compounds, particularly the diisocyanates.

In this event, the crosslinked polymer is designated a polyurethane.

Exemplary of such diisocyanates include hexamethylene-1,6-diisocyanate (HDT), 4,4'-diphenylmethane-diisocyanate (HMDI) and 3-isocyanatomethyl-3,5,5-trimethylcyclohexylisocyanate (IPDI), which is particularly preferred.

A blocking agent, advantageously 1'ε-caprolactam, may also be used to convert the isocyanates into compounds which are inactive at low temperatures.

The preferred polyurethanes are, in particular, those described in FR-2,243,983 and comprise:
(i) 50% to 90% by weight of at least one high molecular weight hydroxylated polyester, preferably prepared from aromatic dicarboxylic acids and diols and/or triols having 4 to 12 carbon atoms;
(ii) 10% to 50% by weight of addition compounds blocked by e-caprolactam, based on 3-isocyanatomethyl-3,5,5-trimethylcyclohexane, said blocked addition compounds preferably containing 0.01% to 5% by weight of free isocyanates.

The hardening or crosslinking agent is present in the coating composition in an amount such that the molar ratio of the reactive groups of the crosslinking agent to those of the hydroxylated polymer ranges from 0.6 to 1.5, preferably from 0.7 to 1.3.

The composition of the surface coating according to the invention comprises, as the fourth essential component, at least one organic solvent for the polymer containing hydroxyl groups, having a boiling point ranging from 140° to 310° C., employed in an amount of 19% to 80% by weight, relative to the total weight of the composition. It is preferred that the boiling point of the solvent be at least 200° C.

Exemplary of such solvents include benzyl alcohol, aromatic hydrocarbons having a boiling point of at least 150° C. (marketed under the trademarks Solvesso-100, Solvesso-150 and Solvesso-200 by ESSO), the ethyl ether or butyl ether of ethyleneglycol acetate, isophorone, 2,2,4-trimethylpenetane-1,3-diol isobutyrate, 2,2,4-trimethylpentane-1,3-diol diisobutyrate, cyclohexanone, dimethyl glutarate, dimethyl sebcacate, dimethyl adipate, diglycol butylether, dimethylformamide, N-methylpyrrolidone, propylene carbonate and diisopropylbenzene carbonate. Very often, mixtures of the above solvents are used.

The coating composition optionally contains one or more of the usual adjuvants and additives, for example dispersion agents, agents for modifying the rheological properties, antifoaming agents, UV stabilizers, flowing agents, plasticizers, agents improving brightness and hardening promoters, such as p-toluenesulfonic acid or blocked products of such accelerators.

The pigments or colorants are dispersed exclusively in all or a portion of the thermoplastic resin or resins in powder form, the remainder of the composition being colorless.

Suitable pigments are of the conventional type, i.e., acid, neutral or basic pigments, which may be organic or inorganic. If desired, the pigments may be preliminarily treated to modify their properties. Exemplary of such pigments include titanium dioxide, red iron oxide, orange molybdenate, lead chromate, carbon black and phthalocyanine pigments. The pigments also include metallic pigments, such as aluminum and stainless steel. The weight ratio of the pigment or pigments to the total weight of the thermoplastic resins typically ranges from 0.005 to 0.5, preferably from 0.005 to 0.25.

The optional underlayer or underlayers contain at least one hydroxylated polymer, at least one crosslinking agent therefor, and at least one organic solvent, such as described above.

The crosslinking agent is present in the composition of the underlayer in an amount such that the molar ratio of the reactive groups of the crosslinking agent to the those of the hydroxylated polymer or polymers ranges from 0.6 to 1.5, preferably from 0.7 to 1.3.

The polymer or polymers bearing hydroxyl functions constitute 20% to 90% by weight of the total weight of the composition, preferably 20% to 50% by weight.

The solvent or solvents constitute 10% to 60% by weight of the composition, preferably 20% to 40% by weight.

The pigments or colorants are of the same nature as those indicated above. The weight ratio of the pigment or pigments to the total weight of the composition of the underlayer or underlayers advantageously ranges from 0.1 to 1. Different pigments may be used, provided that the color obtained is uniform to the eye.

The different layers of the multicolor coating according to the invention may be applied by various techniques of liquid application, such as a varnishing machine (roll coater) directly or by "reverse roll", gun projection (pulverization) mixed with air or airless, curtain coating, but preferably by a process of strip coating, also designated coil coating.

Application by a strip coating process is especially preferred. It is described, specifically, in *Metal Finishing*, pages 21–24 (September 1981).

Following the coating of the substrate by the underlayer or underlayers, the coating is cured for 20 to 60 seconds, typically in an oven heated to a temperature of from 300° to 400° C. in a manner such that the maximum temperature of the substrate does not exceed 250° C.

The substrate is then cooled, for example in ambient air or by immersion in water, and then dried in air. It is then conditioned to receive the surface coating, which is cured and cooled under conditions similar to those indicated above in respect of the underlayer or underlayers.

The substrates to which the multicolor coatings according to the invention are applied may be of diverse nature, but must withstand transport through the oven necessary for the film formation of the multicolor coating.

Generally, such substrates are advantageously metallic substrates (steel, iron, aluminum, alloys), but wood, plastic, glass or paper substrates may also be used.

Prior to coating, the substrate may be subjected to one or more surface treatments to improve the adherence of the coating. Exemplary of such treatmenets include degreasing of the substrate surface, oxidizing treatments such as flaming, corona discharge, plasma action, etc.

The composite materials produced by deposition of the above multicolor coating comprise:
(a) a surface coating having a thickness of from 10 to 100 μm, preferably from 10 to 30 μm,
(b) optionally, one or more underlayers having a total thickness of from 5 to 40 μm, preferably from 10 to 30 μm, and
(c) a support substrate, for example a metallic substrate, variable in thickness.

These composite materials are especially suitable for the production of aesthetically pleasing items.

In order to further illustrate the present invention and the advantages thereof, the following specific examples are given, it being understood that same are intended only as illustrative and in nowise limitative. In said examples to follow, all parts and percentages are given by weight, unless otherwise indicated.

EXAMPLE 1

(A) Preparation of the Coating (Underlayer) And Surface Layer Or Layers:

A grinding paste was prepared by mixing a portion of the components of the coating in a dispersion in one or more solvents.

A ball mill was used to produce the dispersion.

Once the dispersion was prepared, the remainder of the coating materials were added, the components intimately admixed and the coating rendered viscous.

(B) Components Of The Underlayer:
Nature of the grinding paste:
This paste contained:
(1) 60% polyurethane resin in a 2/1 mixture of xylene and ethylene glycol acetate.

|  | Parts |
|---|---|
| The polyurethane resin (polyester with hydroxyl/IDPI/ε-caprolactam endgroups has a viscosity, measured according to DIN Standard 51 562 equal to 10 ± 1.5 d Pa.s and a density at 25° C., measured according to DIN Standard 51 757, of 1.06: | 22.20 |
| (2) Titanium dioxide (white pigment) (d = 3.9) | 22.20 |
| (3) Mixture of 50/50 butylene diglycol acetate and Solvesso 200 ® marketed by ESSO (mixture of aromatic hydrocarbons) having a boiling point between 224° and 285° C.) | 11.10 |
| Addition: | |
| (1) Polyurethane resin having the same characteristics as that used in the grinding paste | 24.05 |
| (2) flow control agent | 0.20 |
| (3) 40% tin dibutyllaurate in the butylene glycol acetate | 0.70 |
| Viscosity Adjustment: | |
| 50/50 mixture of butylene diglycol acetate and Solvesso 200 ® | 19.50 |

For the composition of the underlayer the pigment/binder ratio=0.8 and the amount of dry solids=50%.

(C) Components of the Surface Layer:

| (1) Polymer having hydroxyl radicals: | 75.85 |
|---|---|
| the polyurethane resin described under (B) | |
| (2) Thermoplastic resin: | |
| PA-11 (Mn = 15,000) | |
| having a grain size distribution ranging from 20 to 80 μm, composed of the following: | |
| PA-11 green color (8% of pigments) | 1.50 |
| PA-11 blue color (5% of pigments) | 1.50 |
| PA-11 white (25% of pigments) | 1.50 |
| Viscosity Adjustment: | |
| 50/50 mixture of butylene diglycol acetate and Solvesso 200 ® | 19.65 |

(D) Procedure:

The underlayer was deposited onto the sample and crosslinked for 40 seconds in an oven at 340° (the maximum temperature of the substrate was 240° C.).

The substrate coated in this manner was cooled by immersion in water, then dried in ambient air.

The conditions of the application, crosslinking and cooling of the surface layer were identical to those used for the underlayer.

A composite material having the following characteristics was produced:
(a) a white underlayer having a thickness of about 20 μm;
(b) a surface layer having a thickness of about 20 μm;
(c) an aluminum substrate treated with BONDER® 715 having a thickness of 0.8 mm.

EXAMPLE 2

A composite material was produced according to the procedure of Example 1; it had the following characteristics:
(a) an underlayer of a composition and thickness identical to that of Example 1;
(b) a surface layer having the same thickness as that of Example 1;
(c) a substrate identical to that of Example 1.

The components of the surface layer were the following:

| | |
|---|---|
| (1) Polymers having hydroxyl radicals: | |
| polyurethane resin described under (1)(B), | |
| (2) Thermoplastic resin: | |
| PA-11 (Mn = 15,000) | |
| having a grain size distribution ranging from 20 to 80 μm, composed of the following: | |
| PA-11 green color (8% of pigments) | 1.50 |
| PA-11 blue color (5% of pigments) | 1.50 |
| PA-11 white (25% of pigments) | 1.50 |
| PA-11 natural | 1.50 |
| Viscosity Adjustment: | |
| 50/50 mixture of butylene diglycol and Solvesso 200 ® | 18.15 |

The dry solids content of the composition was equal to 51.5%.

A comparison of the appearance of the coatings of Example 1 and 2, the pigment content in the PA-11 being identical, evidenced that the multicolor appearance of the coating of Example 2 was less pronounced; the tints were more pastel.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A composite article having a multicolored coating produced by coating a support with (a) at least one multicolored coating composition, said multicolored coating composition comprising (i) at least one hydroxylated polymer and (ii) an effective amount of a crosslinking agent therefor, (iii) at least one organic solvent for said at least one hydroxylated polymer, said at least one organic solvent having a boiling point ranging from 140° to 310° C., and (iv) a multicolored powder of at least one solid thermoplastic resin having a softening point ranging from 110° C. to 230° C. and having a particle size ranging from 0.5 to 200 microns, wherein the coating composition is colorless except for the multicolored powder (iv); and wherein the support, optionally, further contains (b) at least one colored interlayer deposited thereon, between said support substrate and multicolored face surface coating composition, said at least one colored interlayer produced by coating the support with an interlayer composition comprising at least one hydroxylated polymer, a crosslinking agent therefor, and further wherein the interlayer differs in color from at least one color of the multicolored powder.

2. The composite article as defined by claim 1, said multicolored powder comprising solid thermoplastic resin particulates of different colors.

3. The composite article as defined by claim 1, said at least one hydroxylated polymer comprising a polyacrylate, an epoxy resin or a polyester.

4. The composite article as defined by claim 1, said crosslinking agent comprising an aminoplast.

5. The composite article as defined by claim 1, said crosslinking agent comprising an isocyanate compound.

6. The composite article as defined by claim 5, said isocyanate crosslinking agent comprising a diisocyanate.

7. The composite article as defined by claim 5, said isocyanate crosslinking agent comprising a blocked isocyanate.

8. The composite article as defined by claim 1, said at least one solid thermoplastic resin comprising a polyamide or polyetheramide.

9. The multicolored coating composition as defined by claim 8, said at least one solid thermoplastic resin comprising ω-aminoundecanoic acid, polylauryllactam, caprolactam and lauryllactam, poly(dodecanedicarboxyamide) or mixture thereof.

10. The composite article as defined by claim 1, comprising from 1% to 80% by weight of said at least one solid thermoplastic resin, from 1% to 80% by weight of said at least one hydroxylated polymer, and from 19% to 80% by weight of said at least one organic solvent.

11. The composite article as defined by claim 10, said at least one hydroxylated polymer having a number average molecular weight ranging from 800 to 20,000 and a hydroxyl number ranging from 1.5 to 6.

12. The composite article as defined by claim 9, comprising from 35% to 70% by weight of said at least one hydroxylated polymer.

13. The composite article as defined by claim 10, said at least one hydroxylated polymer comprising a hydroxylated polyester.

14. The composite article as claim 13, said hydroxylated polyester comprising silicon-containing moieties.

15. A composite article having a multicolored coating comprising a support substrate coated with (a) at least one multicolored face surface coating composition which comprises at least one crosslinked hydroxylated polymer having dispersed therein a multicolored powder comprising solid thermoplastic resin particles, having a softening point ranging from 110° C. to 230° C. wherein the composition is colorless except for the multicolored powder, and, optionally, (b) at least one colored interlayer located between said support substrate and said multicolored surface coating composition, said interlayer differing in color from at least one color of the multicolored powder.

16. The composite article as defined by claim 15, having a speckled or pebbled face surface appearance.

17. The composite article as defined by claim 15, further comprising at least one colored interlayer deposited between said support substrate and said multicolored face surface coating composition.

18. The composite article as defined by claim 17, said at least one interlayer having a uniform tint differing from at least one tint of said multicolored face surface coating composition.

19. The composite article as defined by claim 8, said at least one interlayer comprising at least one colorant.

20. The composite article as defined by claim 17, said at least one interlayer comprising at least one cross-linked hydroxylated polymer.

21. The composite article as defined by claim 17, said support substrate comprising a metal or alloy thereof.

22. The composite article as defined by claim 17, said support substrate comprising metal, plastic, glass or paper.

23. The composite article according to claim 15, said multicolored powder comprising pigments or colorants dispersed exclusively in all or a portion of said thermoplastic resin in powder form, any remainder of said composition being colorless.

24. The composite article as defined by claim 15 wherein the multicolored powder comprises solid thermoplastic resin particles or different colors.

* * * * *